United States Patent
Altinsoy

(10) Patent No.: US 12,434,505 B2
(45) Date of Patent: Oct. 7, 2025

(54) MOTOR-VEHICLE WHEEL-RIM PROTECTOR

(71) Applicants: Livio Stella, Ratingen (DE); Carsten Schaffarz, Neukirchen-Vluyn (DE); Faruk Altinsoy, Meerbusch (DE)

(72) Inventor: Faruk Altinsoy, Meerbusch (DE)

(73) Assignees: Livio Stella, Ratingen (DE); Carsten Schaffarz, Neukirchen (DE)

( * ) Notice: Subject to any disclaimer, the term of this patent is extended or adjusted under 35 U.S.C. 154(b) by 377 days.

(21) Appl. No.: 18/009,378

(22) PCT Filed: Sep. 2, 2020

(86) PCT No.: PCT/EP2020/074411
§ 371 (c)(1),
(2) Date: Jan. 20, 2023

(87) PCT Pub. No.: WO2022/048735
PCT Pub. Date: Mar. 10, 2022

(65) Prior Publication Data
US 2023/0219365 A1  Jul. 13, 2023

(51) Int. Cl.
*B60B 7/01* (2006.01)
*B60B 7/02* (2006.01)
(Continued)

(52) U.S. Cl.
CPC ............. *B60B 7/01* (2013.01); *B60B 7/02* (2013.01); *B60B 7/063* (2013.01); *B60B 7/14* (2013.01);
(Continued)

(58) Field of Classification Search
CPC .... B60B 7/00; B60B 7/01; B60B 7/02; B60B 7/063; B60B 7/14
See application file for complete search history.

(56) References Cited

U.S. PATENT DOCUMENTS 1,948,272 A * 2/1934 Lyon ................. B60B 7/01
301/37.24
1,954,140 A * 4/1934 Lyon ................. B60B 7/01
301/37.24
(Continued)

FOREIGN PATENT DOCUMENTS

DE  4009757 A  10/1991
DE  9205923 U  10/1993
(Continued)

*Primary Examiner* — Kip T Kotter
(74) *Attorney, Agent, or Firm* — Andrew Wilford

(57) ABSTRACT

The invention relates to a device (3) for protecting a wheel rim (2) of a motor vehicle, wherein: an outer side of a rim flange (4) is covered by the device (3): the device (3) consists of a ring (5), the diameter of which is matched to that of the rim flange (4); and the ring (5) has a circumferential tongue (5.2) for fastening the device (3) to the rim flange (4), which tongue can be clamped between an inner side of the rim flange (4) and a side wall of a tyre (1). The device (3) is intended to be held securely on the wheel rim (1) even at very high speeds and correspondingly large forces acting on the device (3). No changes to the wheel rim (1) are necessary, and installation is simple. This is achieved in that the single ring (5) is produced from a hard material and has a continuous radial gap (6) and in that end faces (5.3) of the ring formed by the gap (6) can be connected by means of a clamping screw (8).

11 Claims, 3 Drawing Sheets

(51) Int. Cl.
*B60B 7/06* (2006.01)
*B60B 7/14* (2006.01)

(52) U.S. Cl.
CPC ....... *B60B 2360/10* (2013.01); *B60B 2360/36* (2013.01); *B60B 2900/212* (2013.01)

(56) References Cited

U.S. PATENT DOCUMENTS

| | | |
|---|---|---|
| 2,964,357 A | 12/1960 | Barnes |
| 4,040,582 A | 8/1977 | Krauss |
| 8,807,664 B2 | 8/2014 | Rathbone |
| 2007/0290548 A1 | 12/2007 | Lundy |
| 2008/0018168 A1* | 1/2008 | Conaway ................. B60B 7/01 301/37.24 |
| 2008/0252134 A1 | 10/2008 | Lunn |
| 2014/0049095 A1* | 2/2014 | Rathbone ................. B60B 7/01 301/37.24 |
| 2014/0167490 A1 | 6/2014 | Roh |
| 2018/0050560 A1* | 2/2018 | Boucher ................. B60B 7/01 |
| 2021/0268833 A1* | 9/2021 | Coleman ................. B60B 7/01 |

FOREIGN PATENT DOCUMENTS

| | | |
|---|---|---|
| DE | 202010004397 U | 11/2010 |
| DE | 202009013418 U | 3/2011 |
| DE | 102012015516 A | 5/2014 |
| DE | 102016113234 A | 1/2018 |
| DE | 102019107128 B | 4/2020 |
| GB | 2397561 A | 7/2004 |
| JP | 08188003 A | 7/1996 |
| KR | 101465055 B | 11/2014 |
| WO | 20005009761 A | 2/2005 |
| WO | 2009121120 A | 10/2009 |

\* cited by examiner

MOTOR-VEHICLE WHEEL-RIM PROTECTOR

CROSS REFERENCE TO RELATED APPLICATIONS

This application is the US-national stage of PCT application PCT/EP2020/074411 filed 2 Sep. 2020.

FIELD OF THE INVENTION

The invention relates to a shield for covering an outer edge of a flange of a wheel rim of a motor vehicle, where the shield has a ring having a diameter matched to that of the flange and a circumferential lip of the flange engaged between an inner surface of the flange and a outer side wall of a tire securing the shield to the flange.

BACKGROUND OF THE INVENTION

Such shields are known per se, for example under the term rim protection ring. They are used in particular to protect valuable rims such as, for example, so-called light metal rims from mechanical damage. Such damage can occur during travel in the form of, for example, scratches by contact with objects located on the roadway, or in particular by curb edges. The damage, particularly on outwardly facing sides of outer flanges are annoying because of they are highly visible.

Wheel rims for motor vehicles are basically disk-shaped and form a radially outwardly open circumferential seat. The seat is bounded on each side by a flange of the rim. A tire is secured in the seat between the flanges. The rim and the tire form a wheel.

German utility model 20 2010 004 397 discloses a rim shield ring that is clamped between the tire and the rim flange. The rim shield ring covers only a part of the outer face of the tire, while the rim itself remains unprotected from the outside. The rim shield ring can only be mounted on the rim together with the tire.

German published application 10 2012 015 516 discloses a rim shield ring designed as a decor ring. It is shaped in such a way that it projects outwardly from a plane of the outer edge of the rim, but does not cover it. In this way, only a small protective effect is provided for the rim. The rim shield ring can only be mounted on the rim together with the tire.

German published application DE 40 09 757 describes a rim shield ring made of elastic material with a specially shaped circumferential groove. This groove fits the rim shield ring onto the rim flange. This must be done prior to mounting of the tire.

EP 2 150 421 [U.S. Pat. No. 8,807,664] discloses a rim shield ring made of elastic material with an inner, thin section and a wide head section. The inner portion is clamped between an inner side of a flange and a tire, while the head portion overlaps the flange on the outside and in particular on the flange. The rim shield ring can only be mounted on the rim together with the tire. Due to the elasticity of the material, the head section draws aside when heavily stressed and does not offer any effective protection.

The same applies to US 2014/0167490 where the section for fastening is not continuous here, but has attachment tabs.

U.S. Pat. No. 2,964,357 discloses a decor ring fastened to a flange by resilient clips. The fastening appears relatively uncertain, because the decor ring is only fastened to the associated clip by a second spring element.

US 2007/0290548 describes a ring for protecting a rim clamped to the flange by screws.

WO 2005/009761 discloses a rim shield ring that can be fastened externally on a flange by a clamp. In the case of radial loading, the rim shield ring can jump relatively easily from the rim.

German Utility model 20 2009 013 418 shows a rim in which a protective ring (rim attachment) is screwed on the outside. This can only be used for certain rims.

German published application 10 2016 113 234 describes a rim shield ring where a plurality of fasteners are detachably fastened to the ring and can be clamped between a tire and an inner side of a flange.

A rim protection is known from Korean patent 101 465 055 where a strip-shaped profile is cut to a suitable length and then bent into a ring. A reflector band can then be fixed to the annular profile.

WO 2009/121120 discloses a rim shield ring made of soft material that can be slipped over a flange. A decorative strip may be attached to the ring.

DE 10 2019 107 128, on which this invention is based, discloses a shield for a rim formed from two rings. One of the rings has a circumferential lip and a throughgoing radial slot. The lip ensures a secure hold of the shield on the rim and thus on the wheel because an inner diameter of the lip is smaller than a largest diameter of the flange; the mounting of the first ring is made possible by the slot that permits a short-term elastic spreading of the first ring and thus its inversion via the flange. An unintentional opening of the slot is prevented by the other ring that is detachably fastened to the first ring. The rings are made of hard material.

OBJECT OF THE INVENTION

It is the object of the invention to provide a shield for a wheel rim that is securely held on the rim even at very high speeds and correspondingly large forces act on the shield. In this case, no changes should be necessary on the rim.

SUMMARY OF THE INVENTION

The object is achieved in that the single ring is made of a hard material, has a throughgoing radial slot, and end faces of the ring formed by the slot can be connected by a clamping screw. In this case, "connecting" does not mean that the end faces have to be in direct contact after the connection. In most cases, the end faces are spaced when the shield is mounted, this spacing being bridged by the clamping screw.

The ring and thus the shield is made of hard material. This ensures a high stability and durability and thus also good protection of rim and tire. A "flutter" and its amplitude during rapid rotation of the wheel as in the case of travel of the motor vehicle at high speed are at least minimized.

The slot permits mounting or dismounting of the shield.

The connection of the end faces by a clamping screw ensures the secure retention of the mounted shield on the rim, because a practically closed ring is thus produced that can only be removed from the rim once the clamping screw has been released. In this case, manufacturing tolerances of both the rim and the shield can be compensated for by varying a slot width of the slot, so that the ring can be mounted on the flange at least without play; if appropriate, it is also possible to adjust a prestress of the ring on the flange. The shield and the rim are thus ideally matched to one another, so that a firm and centered hold of the ring on the flange is ensured.

Furthermore, the play-free assembly prevents mutual damage to the rim and shield.

No changes are required on the rim for mounting the shield. The rim remains in the original state and retains its value.

The ring substantially determines the visible appearance of the rim and thus positively influences the appearance of the entire motor vehicle. A design of the ring, such as, for example, with color and/or patterning, is largely freely selectable. Decorative elements such as, for example, screws can also be fastened or imitated on the ring.

The dependent claims relate to advantageous embodiments of the invention.

In one embodiment, the rings are made of a light metal or a light-metal alloy. Overall, the shield can be manufactured in a lightweight manner while still having high strength.

In an alternative embodiment, the rings are made of a carbon composite. This further saves weight.

In a further embodiment, the slot has a width of 5 mm to 20 mm in an untensioned state of the ring. The untensioned state here means that no forces act to open or close the slot. This width of the slot facilitates assembly or disassembly and also permits compensation for large manufacturing tolerances.

In a further embodiment, the clamping screw has different nominal diameters of its two opposite screw threads. This facilitates mounting of the shield caused by an incorrect alignment of the clamping screw with the end faces is immediately noticed.

In a further embodiment, the slot can be covered by a cover clip. This improves the optical effect of the shield, reduces the accumulation of dirt, and can thus facilitate disassembly.

As an alternative to the clip, a decor ring can be fastened to an outwardly directed side of the ring. In this case, the decor ring covers a predetermined part of the rim and optionally a part of an outer flank of the tire. As a result, the protective effect is increased overall. In addition, the appearance of the wheel as a whole is further variable.

Preferably, the cover or the decor ring comprises means for securing the clamping screw against rotation. This means is designed, for example, as a pin that fits with a complementary bore in the clamping screw, or as a clamp. As a result, the clamping screw is prevented from being unintentionally released, resulting in the shield becoming unstable or even jumping off the rim.

BRIEF DESCRIPTION OF THE DRAWING

The invention will be further described with reference to the schematic drawing where.

SPECIFIC DESCRIPTION

As can be seen from FIGS. 1 to 4, a wheel of a motor vehicle has a tire 1 mounted on a rim 2 in a conventional manner. A shield 3 for protecting the rim 2 is provided on an outer edge of the wheel that is a circular surface readily visible with the wheel mounted on the motor vehicle.

Figure 6:
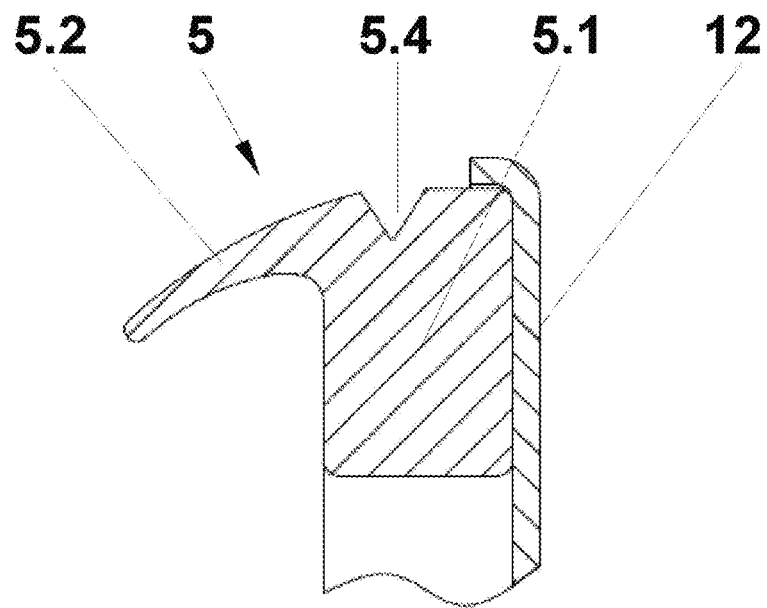
FIG. 6 is a cross section of the shield ring with a decor ring.

As is customary, the rim 2 is a disk one of whose outer edges carries a rim base body 5.1 (FIG. 6). Each side of the rim is delimited by an annular flange 4. The tire 1 that is completely assembled on the rim 2 is clamped with its side walls in the region of its beads between the flanges 4. On the tire 1, an annular thickening made of rubber can be formed on the outside, that is to say when the wheel is mounted, on the side wall in the vicinity of the flange 4.

The shield 3 consists of a one-piece ring 5 whose diameter generally corresponds to the nominal outer diameter of the rim 2. The ring 5 is carried on an outer edge of the outer flange 4 and is exposed outward.

Figure 1:
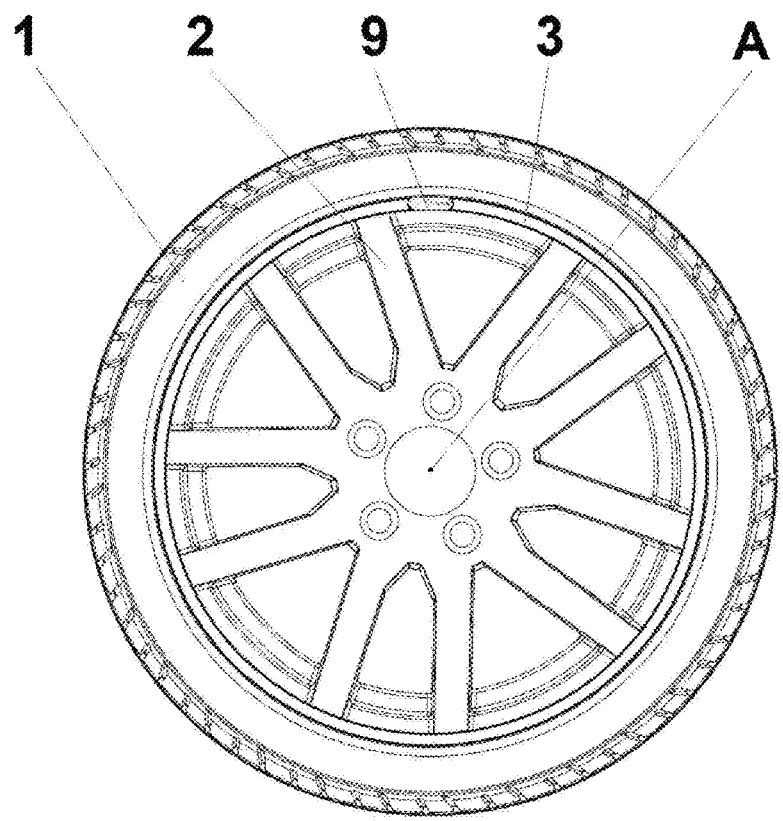
FIG. 1 is a view of a wheel with a mounted shield ring for a rim.
Figure 2:
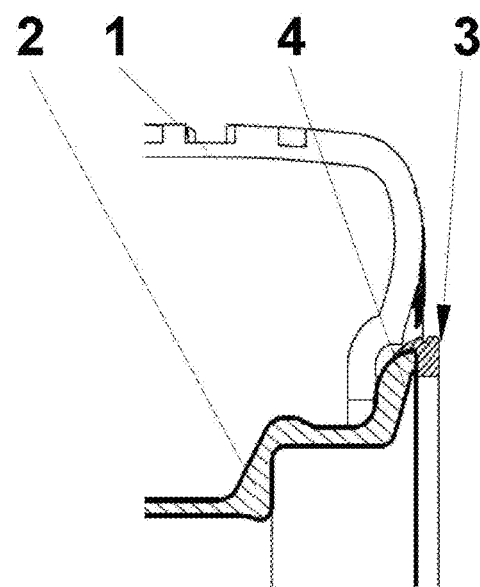
FIG. 2 is a cross section through a part of the wheel of FIG. 1.
Figure 3:
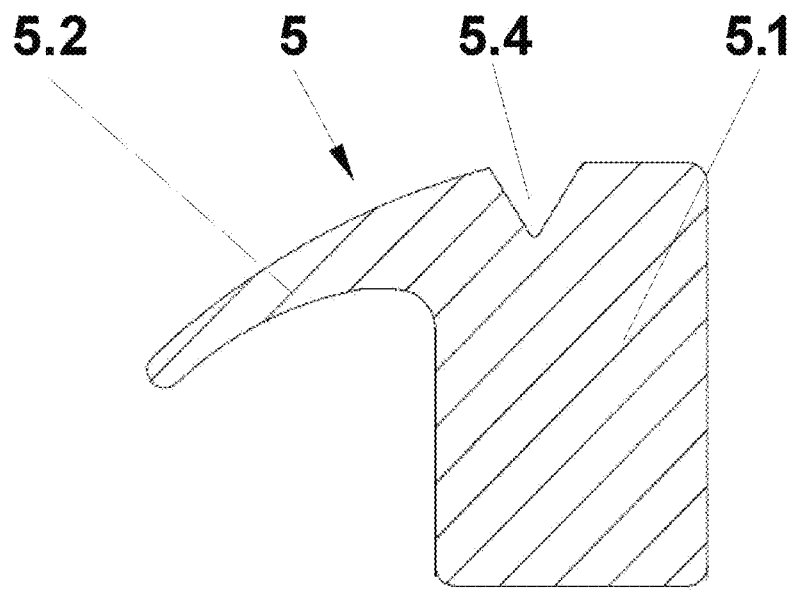
FIG. 3 is a cross section through a ring of the shield.

The ring 5 is shown more clearly in FIG. 3. It is radially split at a single point on its circumference (the ring 5 is thus more precisely a ring section extending through, for example, approximately 350° to approximately 359°) and thus forms a slot 6. As a result of the split, two end faces 5.3 (FIG. 4) are formed at the separating point delimiting the slot 6. The base body 5.1 of the ring 5 is substantially rectangular in cross section.

In an upper end region of a first longitudinal side of the base body 5.1 according to FIG. 3 there is an integral lip 5.2. It extends over the outer edge of the first ring 5 and has a curvature whose concave side faces the base body 5.1. An inner surface of the lip 5.2 is formed from a circular segment and a straight line and conforms to the shape of the outer edge of the flange 4. The lip 5.2 tapers toward its free end so a radius of the circular segment of the convex face of the lip increases outward and this free end is rounded in the shape of a semicircle. The convex boundary also delimits an associated upper, radially outer broad side of the base body 5.1 in extension. As shown, a V-shaped groove 5.4 is formed for example in this radially outer broad side of the base body 5.1.

Figure 4:
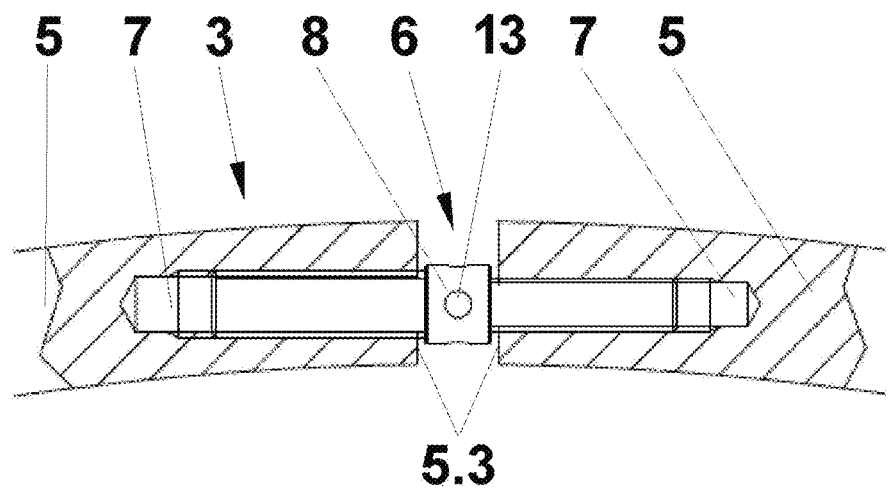
FIG. 4 is a longitudinal section through a detail of the shield ring in the region of a slot.

A respective first blind bore 7 opens perpendicularly at each of the end faces 5.3 as can be seen particularly well in FIG. 4. The two first blind bores 7 preferably have different diameters. An internal thread (not explicitly illustrated) is provided in each of the first blind bores 7, and these two internal threads are of opposite hand.

A clamping screw 8 is provided between the end faces 5.3 and extends into the internal threads of the first blind bores 7. As is usual, it has two external threads (not shown) of opposite hand that have different diameters corresponding to the internal threads of the first blind bores 7. An intermediate part is formed between the external threads, has no thread, and has a larger outer diameter than the larger of its external threads.

Two radial through-bores 13 provided at right angles to one another are formed in the intermediate part; as an alternative to the through-bores, the intermediate part can be hexagonal (not shown), so that it can be rotated axially with a matching tool.

The ring 5 is made of hard material such as light-metal alloy or carbon composite material. The clamping screw 8 is made of steel.

Figure 5A:
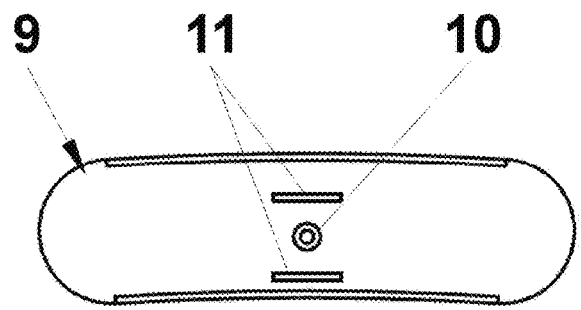
FIG. 5A is a rear view and FIG. 5B is a side view of a retaining clip in detail.
Figure 5B:
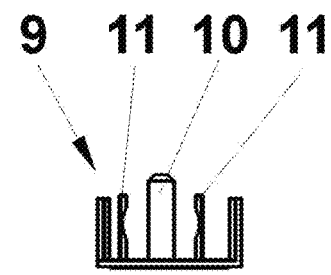

In a preferred embodiment, the slot 6 is covered on the outside by a removable cover clip 9 that is shown in detail in FIGS. 5A and 5B. The clip 9 has the shape of an annular section whose radius largely corresponds to that of the ring 5. A length of the clip 9 is, for example, 3 cm to 6 cm. The clip 9 has a U-shaped cross section with U-legs that at least partially enclose and grip the broad sides of the base body 5.1.

Longitudinal ends of the cover clip 9 can be semicircular as shown in FIGS. 5A and 5B. A means for securing the clamping screw 8 against rotation is provided centrally and closer to the convex side in the longitudinal direction, here in the form of a pin 10 with a circular cross section. The pin 10 projects perpendicularly from an inner surface of the cover clip 9 with a length that is greater than a height of the U-legs and in this case at least so great that the pin 10 completely passes through one of the through-bores 13 of the clamping screw 8 when the cover clip 9 is mounted.

A detent spring 11 is provided radially in front of and behind the pin 10 in such a way that the pair of detent springs 11 engages in a clamping manner on the intermediate part of the clamping screw 8. The cover clip 9 is thus held in a latching and releasable manner on the ring 5. Facing sides of the latching springs 11 are shaped in accordance with the intermediate part, so that, in the case of the hexagonal intermediate part, a securing of the clamping screw 8 against rotation is ensured. A length of the latching springs 11 is at most as great as the axial length of the intermediate part. A surface of the clip 9 that is visible in the mounted state, that is to say the outer surface of the panel 9, can have a decoration such as a logo or a brand.

A plurality of second blind or through bores with internal threads can be let into the outside of the base body 5.1 uniformly over the circumference of the ring 5. As FIG. 6 shows, as an alternative to the arrangement of the clip 9, the outer edge of the ring 5 is covered with a decor ring 12 in which corresponding third through-bores are provided in relation to the above-mentioned second bores. The trim ring 12 is adapted to the diameter of the rim 2 and is substantially planar except for a short angled piece formed at its radially outer edge. The angle piece is a few mm wide and, in the fully assembled shield 3, points inward at a right angle to such an extent that it has no or only a slight play with respect to the radially outer broad side of the base body 5.1. The decor ring 12 is, for example, fastened to the ring 5 by headed screws; alternatively, the angle piece is somewhat wider and has a latching lug that can be latched into the groove 5.4. The decor ring 12 can have a wide variety of designs and can be easily replaced.

In order to mount the shield 3 on a wheel, the ring 5 is first opened by corresponding rotation of the clamping screw 8 to such an extent that the lip 5.2 can be slipped over the flange 4. In this case, the clamping screw 8 is not intended to be completely removed from the first blind bores 7, so that a few threads are held therein. By turning the clamping screw 8 in the opposite direction, the diameter of the shield 3 is reduced to such an extent that the lip 5 bears with slight prestress against the flange 4. Finally, the wheel is fastened to the motor vehicle. The shield 3 is securely fastened to the wheel: on the one hand by the larger outer diameter of the flange 4 with respect to the smallest diameter of the lip 5.2 and, on the other hand, by clamping the lip 5.2 between the flange 4 and the tire 1. Optionally, the cover clip 9 or alternatively the decor ring 12 is fastened to the outside of the base body 5.1.

In order to remove the shield 3 from the wheel, for example to replace the shield or during a tire change, the cover clip 9 or the decor ring 12 is optionally removed from the base body 5.1. The ring 5 is opened by corresponding rotation of the clamping screw 8 to such an extent that the lip 5.2 is pulled away from the flange 4 via the flange 4 and thus the shield 3 can be removed from the wheel.

The invention claimed is:

1. A shield for covering an outer edge of a flange of a rim of a motor-vehicle wheel, the shield 2 comprising:
a ring having a diameter matched to that of the flange, and
a circumferential lip of the ring engaged between an inner surface of the flange and an outer side wall of a tire and securing the shield to the flange, wherein
the ring is made of a hard material and has a throughgoing radial slot defined between a pair of end faces each formed with a blind bore, the bores being provided with internal screwthreads of opposite hand, and
a clamping screw extends across the slot between the end faces of the ring and has opposite ends formed with external screwthreads seated in the blind bores of the ring, whereby rotation of the screw moves the end faces toward or away from each other depending on rotation direction.

2. The shield according to claim 1, wherein the ring is made of a light metal or a light-metal alloy.

3. The shield according to claim 1, wherein the ring is made of a carbon composite material.

4. The shield according to one of claim 1, wherein the slot has a width of 5 mm to 20 mm in an untensioned state of the ring.

5. The shield according to one claim 1, further comprising:
a cover clip covering the slot.

6. The shield according to claim 5, characterized wherein the cover clip has means for blocking rotation of the clamping screw.

7. The shield according to claim 1, further comprising:
a decor ring fastened to an outwardly directed face of the ring.

8. The shield according to claim 7, wherein the decor ring has means for blocking rotation of the clamping screw.

9. A shield for covering an outer edge of a flange of a rim of a motor-vehicle wheel, the shield comprising:
a ring having a diameter matched to that of the flange, and
a circumferential lip of the ring engaged between an inner surface of the flange and an outer side wall of a tire and securing the shield to the flange, wherein
the ring is made of a hard material and has a throughgoing radial slot defined between a pair of end faces, and
a clamping screw extends across the slot between the end faces of the ring, is seated in the ring, and has threaded ends of different nominal diameters seated in the ring at the ends faces 13 thereof.

10. A shield for covering an outer edge of a flange of a rim of a motor-vehicle wheel, the shield comprising:
a ring having a diameter matched to that of the flange, and
a circumferential lip of the ring engaged between an inner surface of the flange and an outer side wall of a tire and securing the shield to the flange, wherein
the ring is made of a hard material and has a throughgoing radial slot defined between a pair of end faces,
a clamping screw extends across the slot between the end faces of the ring and is seated in the ring,
a cover clip covering the slot, and
a pin extending from the cover clip through a hole in the screw for blocking rotation of the clamping screw.

11. A shield for covering an outer edge of a flange of a rim of a motor-vehicle wheel, the shield comprising:
a shield ring having a diameter matched to that of the flange, and
a circumferential lip of the shield ring engaged between an inner surface of the flange and an outer side wall of a tire and securing the shield to the flange, wherein
the shield ring is made of a hard material and has a throughgoing radial slot defined between a pair of end faces, a clamping screw extends across the slot between the end faces of the ring and is seated in the ring, a decor ring is fastened to an outwardly directed face of the shield ring, and a pin extends from the decor ring through a hole in the screw for blocking rotation of the clamping screw.

* * * * *